US009363716B1

(12) United States Patent
Sung et al.

(10) Patent No.: US 9,363,716 B1
(45) Date of Patent: Jun. 7, 2016

(54) COVERAGE AREA ADJUSTMENT FOR CIRCUIT SWITCHED FALLBACK

(71) Applicant: Sprint Spectrum LP, Overland Park, KS (US)

(72) Inventors: Sanghoon Sung, Ashburn, VA (US); Yun Sung Kim, Ashburn, VA (US); Nawara Omary, Vienna, VA (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 14/468,765

(22) Filed: Aug. 26, 2014

(51) Int. Cl.
*H04W 36/22* (2009.01)
*H04W 36/00* (2009.01)

(52) U.S. Cl.
CPC .......... *H04W 36/0022* (2013.01); *H04W 36/22* (2013.01)

(58) Field of Classification Search
CPC ........................... H04W 36/0022; H04W 36/22
USPC .......................................... 455/436, 437, 405
See application file for complete search history.

(56) References Cited

U.S. PATENT DOCUMENTS

| 2013/0331054 | A1* | 12/2013 | Kodali | H04W 36/14 |
| | | | | 455/404.1 |
| 2014/0079022 | A1* | 3/2014 | Wang | H04W 36/22 |
| | | | | 370/331 |

* cited by examiner

*Primary Examiner* — Qutbuddin Ghulamali

(57) ABSTRACT

A first access node co-located with a second access node. The first access node communicates using a first type of wireless service. Scan results indicate whether a wireless device meets a first threshold criteria for being served by the second access node using a second type of wireless service. A time series of a count of these wireless devices is determined. From the time series, an indicator of a moving average of the time series is determined. Based on the moving average, the wireless devices are configured with an indicator of a second threshold criteria that determines whether a respective one of the wireless devices meets a second threshold criteria for being served by the first access node using the first type of wireless service.

20 Claims, 7 Drawing Sheets

COVERAGE AREA ADJUSTMENT FOR CIRCUIT SWITCHED FALLBACK

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Circuit Switched Fall Back (CSFB) is a technology whereby voice services are delivered to 4G packet based devices through the use of a circuit-switched (e.g., GSM) technology. When a 4G device is used to make or receive a voice call, the device "falls back" to a 3G or 2G network to complete the call.

Overview

In an embodiment, a method of operating a communication system includes communicating with wireless devices using a first type of wireless service. These wireless devices include a first wireless device. A command is sent to the first wireless device that results in the first wireless device scanning for a second type of wireless service. An indicator is received from the first wireless device. This indicator communicates that a first threshold criteria associated with the first wireless device not being within a coverage area for the second type of wireless service is met. Based on a number of the wireless devices also meeting the first threshold criteria, the first wireless device is configured with a second threshold criteria that changes a coverage area for the first type of wireless service.

In an embodiment, a communication system includes a first access node configured to communicate with wireless devices using a first type of wireless service. These wireless devices include a first wireless device. The communication system also includes a second access node configured to communicate with the wireless devices using a second type of wireless service. The first access node is also configured to receive indicators from wireless devices that communicate whether a first threshold criteria associated with the second access node being able to serve a respective one of the wireless devices is met. The first access node is also configured to, based on a count of the wireless devices not having the first threshold criteria met, configure the wireless devices with a second threshold criteria that adjusts a coverage area where a third threshold criteria associated with the first access node being able to serve the respective wireless devices is met.

In an embodiment, method of operating a communication system includes communicating with wireless devices using a first access node co-located with a second access node. The first access node communicates using a first type of wireless service. From each of a first subset of the wireless devices, a corresponding indicator of a scan result is received. Each scan result indicates whether a respective one of the first subset of the plurality of wireless devices meets a first threshold criteria for being served by the second access node using a second type of wireless service. A time series of a count of a second subset of the wireless devices that do not meet the first threshold criteria for being served by the second access node using the second type of wireless service is determined. From the time series, an indicator of a moving average of the time series is determined. Based on the moving average, the plurality of wireless devices are configured with an indicator of a second threshold criteria that determines whether a respective one of the wireless devices meets a second threshold criteria for being served by the first access node using the first type of wireless service.

DETAILED DESCRIPTION

In an embodiment, co-located 3G and 4G cells may have different coverage areas. The differing coverages between the 3G and 4G services may be a result of differing over-the-air path loss due to different frequencies of operation and/or differing power spectral density characteristics. These differing coverage areas can lead to a wireless device being in a location where it can receive 4G service, but not 3G service.

When a device that is receiving 4G service but not 3G service and the device is used to make or receive a voice call in a system that utilizes circuit-switched fallback, the voice call will fail because when the system tries to "fall back" to 3G service to complete the call, the 3G service is not available. This can cause unnecessary battery drain and network signaling.

In an embodiment, wireless devices connected to the 4G service scan to determine whether they can also receive 3G service. These results are reported to the access node. When the access node determines that too many (e.g., more than a threshold number) wireless devices are getting 4G service, but cannot complete calls using CSFB because they do not have 3G service, the access node broadcasts a new 4G network entry configuration. The new 4G network entry requires better air-interface conditions for receiving 4G service, thereby reducing the 4G coverage area. By reducing the 4G coverage area, the number of wireless devices that are getting 4G, but not 3G, service is reduced thereby reducing the likelihood that unnecessary attempts at CSFB will occur. In addition, reducing the 4G coverage area helps to match the 4G coverage area to the 3G coverage area thereby reducing the number of wireless devices that get 4G, but not 3G, service.

Figure 1:
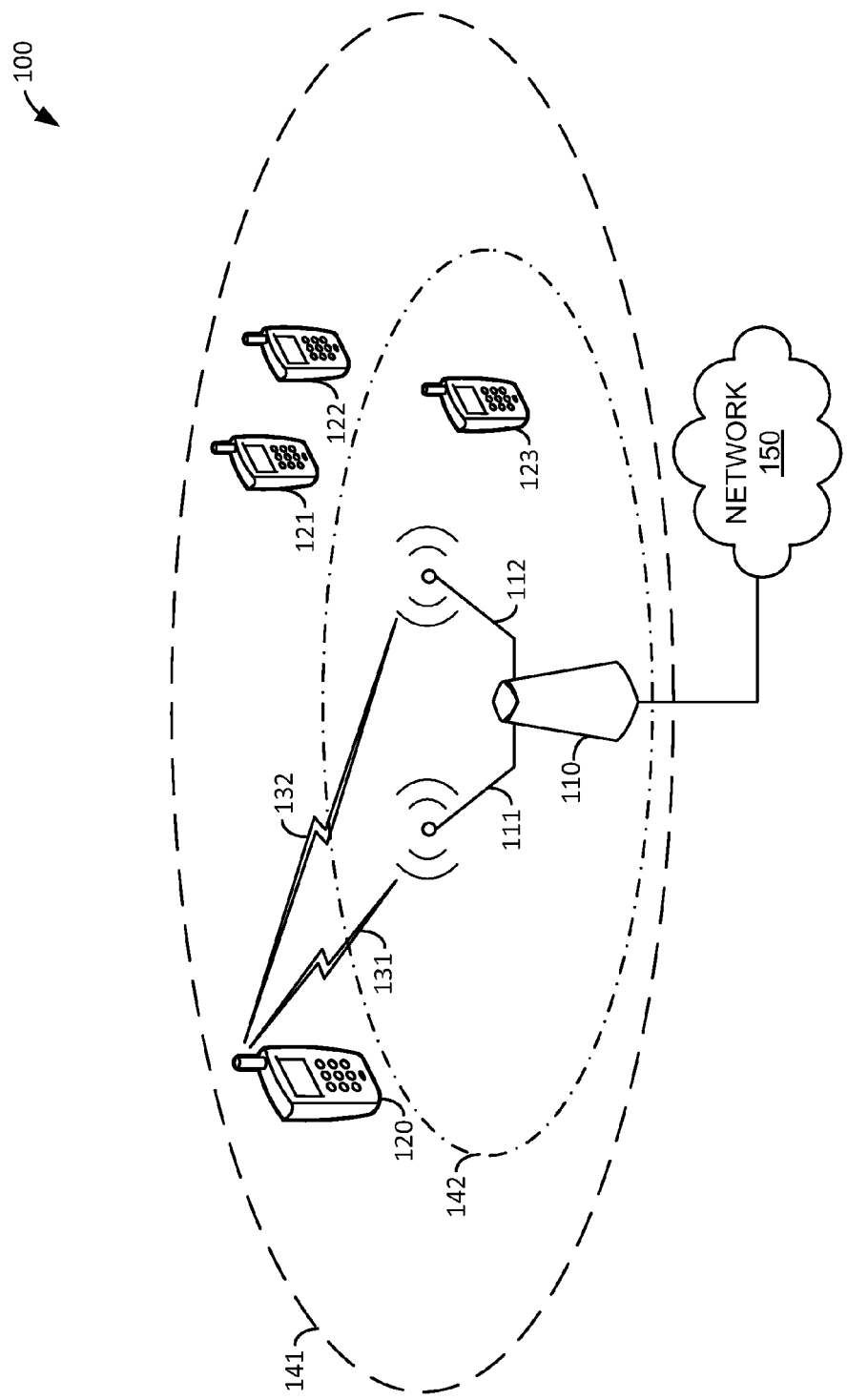
FIG. 1 is a block diagram illustrating a communication system.

FIG. 1 is a block diagram illustrating a communication system. In FIG. 1, communication system 100 comprises access node 110, wireless device 120, wireless device 121, wireless device 122, wireless device 123, and network 150. Access node 110 includes co-located access nodes 111 and 112. In an embodiment, access nodes 111 and 112 are not co-located, but have overlapping service areas. Access node 110 is operatively coupled to network 150. Wireless device 120 may be operatively coupled to access node 110 via wireless link 131 and access node 111. Wireless device 120 may be operatively coupled to base station 110 via wireless link 132 and access node 112.

Access node 111 may provide a first type of wireless service to wireless device 120 via wireless link 131. For example, access node 111 may provide a wireless service based on orthogonal frequency division multiplexing (OFDM) or orthogonal frequency division multiple access (OFDMA). In another example, access node 111 may provide a high bandwidth wireless service based on recent standards (i.e., 4G wireless service). Examples of these high bandwidth wireless services include, but are not limited to, WiMAX and LTE. Other types of high bandwidth wireless services may be provided by access node 111. Access node 111 provides wireless service to wireless devices within coverage area 141. In FIG. 1, all of wireless devices 120-123 are shown within coverage area 141.

Access node 112 may provide a second type of wireless service to wireless device 120 via wireless link 132. For example, access node 112 may provide wireless service that is based on code division multiple access (CDMA) or time division multiple access (TDMA). In another example, access node 112 may provide a wireless service that is based on cellular phone technology standards. Examples of wireless services based on cellular technologies include, but are not limited to, EV-DO, Global System for Mobile communications (GSM), CDMA, and TDMA. Other types of cellular technology type wireless services may be provided by access node 112. Access node 112 provides wireless service to devices within coverage area 142. In FIG. 1, wireless device 123 is shown within coverage area 142. Wireless devices 120-122 are shown outside of coverage area 142.

Wireless devices 120-123 may be any device, system, combination of devices, or other such communication platform capable of communicating with access node 110 using services provided by access node 111 and access node 112, and wireless links 131 and 132, respectively. As discussed above, wireless link 131 and wireless link 132 provide communication between wireless device 120 and access node 111 and access node 112 using two different wireless services. Each of wireless devices 120-123 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 110 via wireless links. Other types of communication platforms are possible.

Access node 110 may be any wireless system that provides two different types of wireless service air interfaces to wireless devices 120-123, and communication connectivity to network 150. Access node 111 and access node 112 may be any wireless system that provides a single air interface to wireless device 120, and communication connectivity to network 150. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Network 150 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Network 150 may also comprise a wireless network, including base stations, wireless communication nodes, telephony switches, internet routers, network gateways, computer systems, communication links, or some other type of communication equipment, and combinations thereof. Wired network protocols that may be utilized by network 150 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 110 and network 150 which are omitted for clarity, including additional processing nodes, routers, gateways, and physical and/or wireless data links for carrying data among the various network elements.

In an embodiment, wireless devices 120-122 are located within coverage area 141 but not within coverage area 142. Thus, for example, wireless device 120 is able to communicate with access node 111 using the first type of wireless service, but not able to communicate with access node 112 using the second type of wireless service. In other words, access node 112 is unable to establish wireless link 132.

Access node 110 communicates with wireless devices 120-123 using the first type of wireless service. Access node 110 can send, via access node 111 using the first type of wireless service, a command that instructs wireless device 120 to scan for the second type of wireless service. After completing a scan for the second type of wireless service, wireless device 120 may return an indicator to access node 110 that wireless device 120 does not meet the criteria for communicating using the second type of wireless service. In other words, wireless device 120 may send, to access node 110 and via access node 111, an indicator that one or more network entry conditions are not met by the signal that wireless device 120 is receiving from access node 112. Each of wireless device 121 and wireless device 122 may also be instructed to scan for the second type of wireless service.

Based on the number of wireless devices 120-122 that can communicate with access node 110 using the first type of wireless service, but do not meet the criteria to communicate with access node 110 using the second type of wireless service, access node 110 can make a decision to adjust the coverage area of the first type of wireless service. In other words, if the number (or a moving average of the number) of wireless devices 120-122 that are within coverage area 141 but not within coverage area 142 exceeds a configured threshold, access node 110 may adjust one of more signal quality thresholds that need to be met by a respective wireless device 120-123 in order for that wireless device 120-123 to receive the first type of wireless service. By increasing the signal quality thresholds (i.e., requiring either, or both, of increased signal power or better signal quality), coverage area 141 is reduced. By reducing coverage area 141, the area encompassed by coverage area 141 may better match the area encompassed by coverage area 142.

In an example, access node 110 may configure wireless devices 120-123 with an updated reference signal received power (RSRP) threshold necessary for LTE network entry (attach procedure) or LTE network re-entry from an idle state. In another example, access node 110 may configure wireless devices 120-123 with an updated reference signal received quality (RSRQ) threshold necessary for LTE network entry (attach procedure) or LTE network re-entry from an idle state. Access node 110 may configure wireless devices 120-123 by broadcasting system information blocks (SIBs) with updated thresholds. For example, LTE SIB1 configures wireless devices 120-123 with network initial entry conditions (thresholds) and SIB3 configures network re-entry conditions.

Access node 110 may use a moving average of the number of wireless devices 120-122 that are within coverage area 141, but not within coverage area 142, as the basis for deciding when to adjust coverage area 141. For example, access node 110 may determine a time series of the count of wireless devices 120-122 that are within coverage area 141, but not within coverage area 142 (for example, as determined by the 3G scan reports received from wireless devices 120-123.) This time series may be smoothed (i.e., filtered) to determine a moving average. This smoothing may be based on an autoregressive model of the number of wireless devices 120-122 that are within coverage area 141, but not within coverage area 142, meeting a threshold criteria. An example moving average can be based on the calculation:

$$A_t = \alpha C_t + (1-\alpha) A_{t-1}$$

where $A_t$ is the moving average for the current iteration, $A_{t-1}$ is the moving average for the previous iteration $C_t$ is the current number of wireless devices 120-122 that are within coverage area 141, but not within coverage area 142, and a is a constant between 0 and 1.

Figure 2:
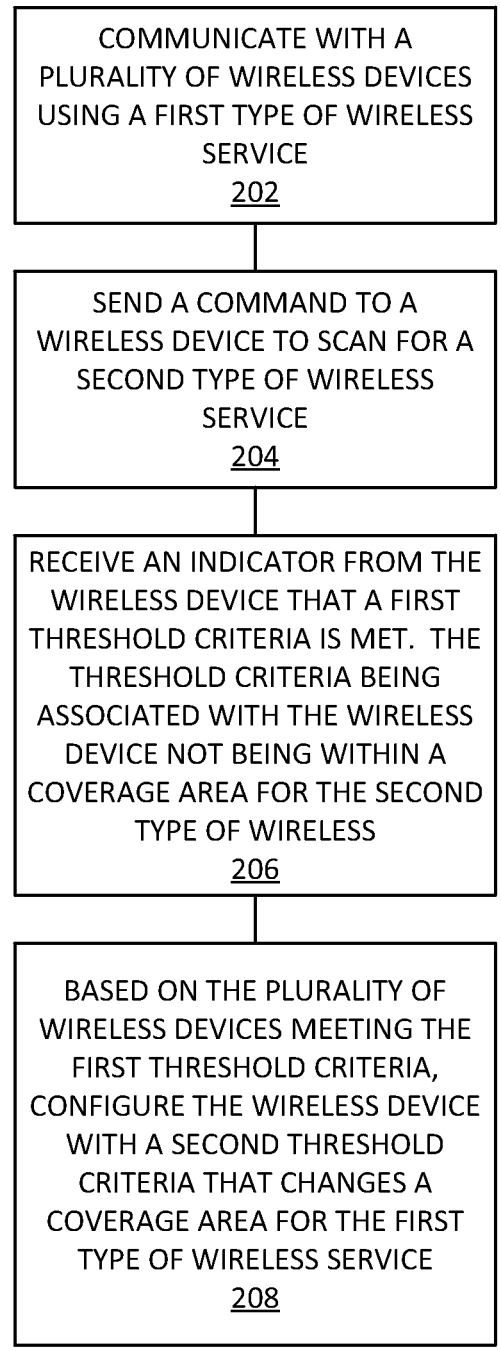
FIG. 2 is a flowchart illustrating a method of operating a communication system.

FIG. 2 is a flowchart illustrating a method of operating a communication system. The steps illustrated in FIG. 2 may be performed by one or more of the elements of communication system 100. A plurality of wireless devices are communicating using a first type of wireless service (202). For example, access node 110 (using access node 111) may communicate with wireless devices 120-123 using a first type of wireless service. In an embodiment, this first type of wireless service may be LTE.

A command is sent to a wireless device to scan for a second type of wireless service (204). For example, access node 110 may send a command to wireless device 120 that causes wireless device 120 to scan for a second type of wireless service (e.g., the type of wireless service being provided by access node 112.) In an embodiment, this second type of wireless service may be a circuit-switched type of wireless service based on cellular technology such as GSM, CDMA, or TDMA.

An indicator is received from the wireless device that a first threshold criteria is met. The threshold criteria being associated with the wireless device not being within a coverage area for the second type of wireless service (206). For example, access node 110 may receive a scan report from wireless device 120 that indicates wireless device 120 is not receiving the required signal strength and/or signal quality necessary to receive the second type of wireless service from access node 112.

Based on the plurality of wireless devices meeting the first threshold criteria, the wireless device is configured with a second threshold criteria that changes a coverage area for the first type of wireless service (208). For example, based on the number of wireless devices 120-122 that can communicate with access node 110 using the first type of wireless service, but do not meet the criteria to communicate with access node 110 using the second type of wireless service, access node 110 can broadcast configuration information that causes a change in coverage area 141. Access node 110 may configure wireless devices 120-123 with an updated RSRP threshold and/or an updated RSRQ threshold necessary for LTE network entry (attach procedure) or LTE network re-entry from an idle state. Access node 110 may configure wireless devices 120-123 by broadcasting one or more SIBs with updated thresholds.

Figure 3:
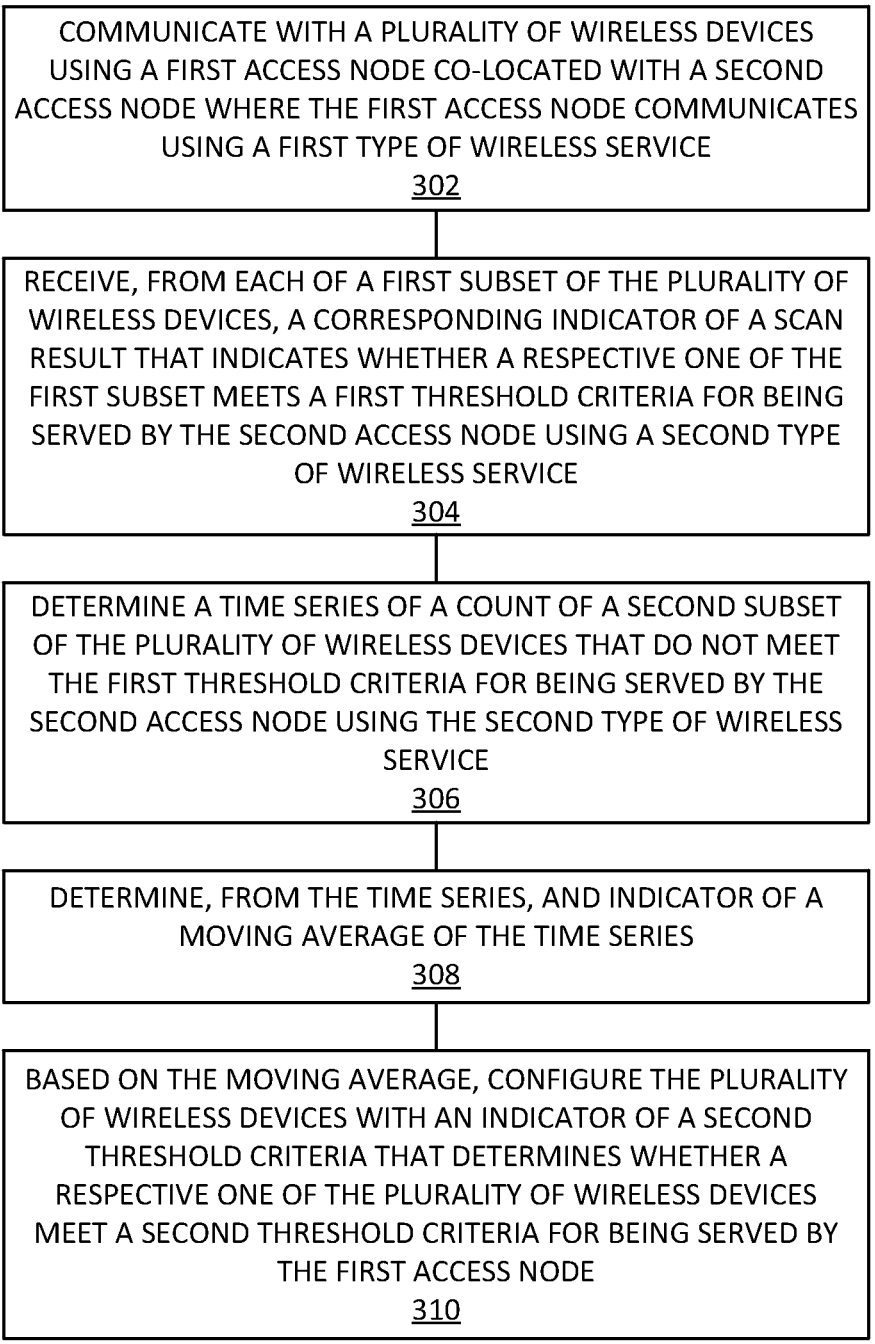
FIG. 3 is a flowchart illustrating a method of configuring a communication system.

FIG. 3 is a flowchart illustrating a method of configuring a communication system. The steps illustrated in FIG. 3 may be performed by one or more of the elements of communication system 100. A plurality of wireless devices are communicating with a first access node co-located with a second access node, where the first access node communicates using a first type of wireless service (302). For example, access node 111, which is co-located with access node 112, may communicate with wireless devices 120-123 using a first type of wireless service. In an embodiment, the first type of wireless service may be LTE.

From each of a first subset of the plurality of wireless devices, a corresponding indicator of a scan result that indicates whether a respective one of the first subset meets a first threshold criteria for being served by the second access node using a second type of wireless service is received (304). For example, access node 110 can receive indicators of scan results from each of wireless devices 120-123. The scan results each indicate whether a particular wireless device 120-123 is receiving the required signal strength and/or signal quality necessary to connect (or reconnect) to the second type of wireless service being provided by access node 112. In an embodiment, this second type of wireless service may be a circuit-switched type of wireless service based on cellular technology such as GSM, CDMA, or TDMA.

A time series of a count of a second subset of the plurality of wireless devices that do not meet the first threshold criteria for being served by the second access node using the second type of wireless service is determined (306). For example, access node 110 may maintain a time series of the number of wireless devices 120-123 receiving the first type of wireless service (e.g., LTE) but that don't meet the threshold requirements to receive the second type of wireless service (e.g., a time series of the count of wireless device 120-122 which are within coverage area 141, but not within coverage area 142.)

From the time series, an indicator of a moving average is determined (308). For example, access node 110 may determine a moving average of the number of wireless devices 120-123 that are connected using the first type of wireless service, but don't meet the threshold requirements to receive the second type of wireless service. An example moving average can be based on the calculation:

$$A_t = \alpha C_t + (1-\alpha) A_{t-1}$$

where $A_t$ is the moving average for the current iteration, $A_{t-1}$ is the moving average for the previous iteration $C_t$ is the current number of wireless devices 120-122 that are connected using the first type of wireless service (e.g., LTE), but don't meet the threshold requirements to receive the second type of wireless service, and a is a constant between 0 and 1.

Based on the moving average, the plurality of wireless devices are configured with an indicator of a second threshold criteria that determines whether a respective one of the plurality of wireless devices meet a second threshold criteria for being served by the first access node (310). For example, access node 110 may, based on a moving average of the number of wireless devices 120-123 that are connected using the first type of wireless service, but don't meet the threshold requirements to receive the second type of wireless service, broadcast an updated RSRP threshold and/or an updated RSRQ threshold necessary for LTE network entry (attach procedure) or LTE network re-entry from an idle state.

Figure 4:
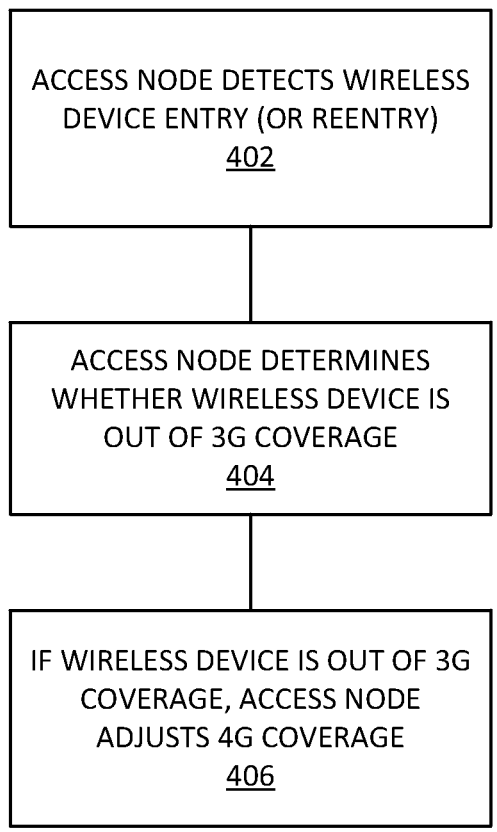
FIG. 4 is a flowchart illustrating a method of operating a communication system.

FIG. 4 is a flowchart illustrating a method of operating a communication system. The steps illustrated in FIG. 4 may be performed by one or more of the elements of communication system 100. An access node detects entry (or reentry) of a wireless device (402). For example, access node 110 may detect the entry (or reentry) of wireless device 120.

The access node determines whether the wireless device is out of 3G coverage (404). For example, access node 110 may instruct wireless device 120 to perform a scan for 3G service. The results of this scan may inform access node 110 that wireless device 120 is not experiencing the required air-interface conditions for establishing a 3G connection to access node 110. This may be referred to as 3G coverage diagnosis.

If the wireless device is out of 3G coverage, the access node adjusts 4G coverage (406). For example, if the scan results from box 404 indicate that wireless device 120 is not experiencing the required air-interface conditions for establishing a 3G connection to access node 110, access node 110 may configure wireless devices 120-123 in a manner that changes the area encompassed by coverage area 141. This may be referred to as 4G coverage adjustment.

Figure 5:
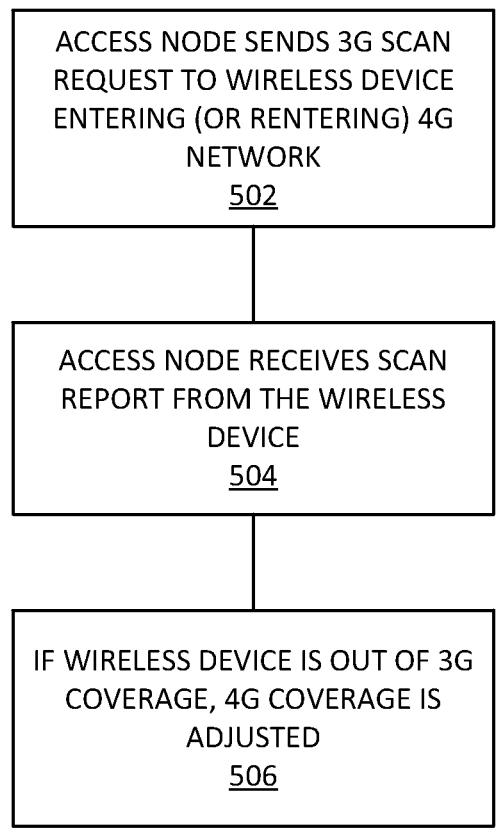
FIG. 5 is a flowchart illustrating a method of determining whether to adjust a coverage area.

FIG. 5 is a flowchart illustrating a method of determining whether to adjust a coverage area. The steps illustrated in FIG. 5 may be performed by one or more of the elements of communication system 100. It should be understood that the steps illustrated in FIG. 5 may be performed as part of 3G coverage diagnosis. An access node sends a 3G scan request to a wireless device entering (or reentering) a 4G network (502). For example, when wireless device 120 enters (or reenters) the 4G wireless network being provided by access node 111, access node 110 may instruct wireless device 120 to perform a scan for 3G service. In an embodiment, access node 111 may send an RRC Reconfiguration message to instruct wireless device 120 to perform 3G RF scanning.

The access node receives the scan report from the wireless device (504). For example, access node 110 may receive a scan report from wireless device 120. This scan report may include a channel measurement report which indicates whether 3G coverage was discovered by wireless device 120.

If the wireless device is out of 3G coverage, 4G coverage is adjusted (506). For example, if access node 110 determines that wireless device 120 has not discovered 3G coverage, access node 110 may adjust the requirements for 4G coverage. Adjusting the requirements for 4G coverage can adjust the area (and the wireless devices 120-123) receiving 4G coverage.

Figure 6:
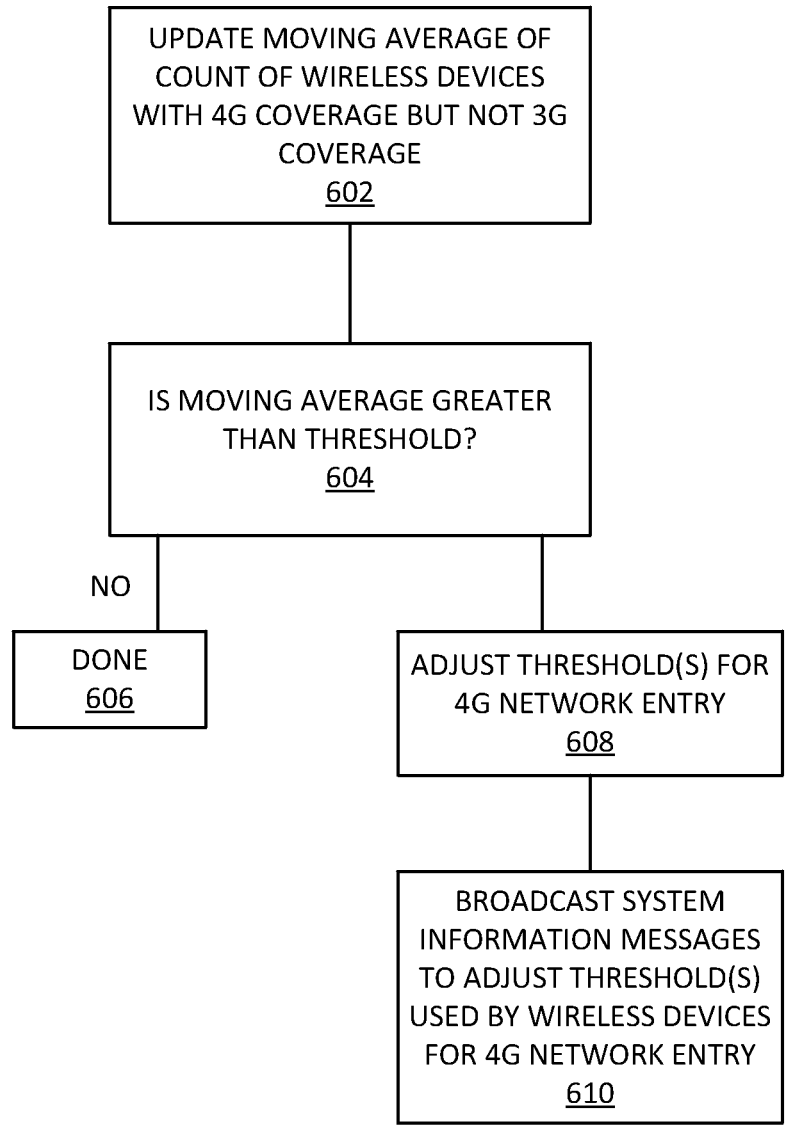
FIG. 6 is a flowchart illustrating a method of adjusting a coverage area.

FIG. 6 is a flowchart illustrating a method of adjusting a coverage area. The steps illustrated in FIG. 6 may be performed by one or more of the elements of communication system 100. It should be understood that the steps illustrated in FIG. 6 may be performed as part of 4G coverage adjustment. A moving average of the count of wireless devices with 4G coverage but not 3G coverage is updated (602). For example, access node 110 may update a moving average (e.g., smoothed or filtered) of the count of the wireless devices 120-122 that discover 4G coverage but not 3G coverage. In an embodiment, the moving average is based on the calculation:

$$A_t = \alpha C_t + (1-\alpha) A_{t-1}$$

where $A_t$ is the moving average for the current iteration, $A_{t-1}$ is the moving average for the previous iteration $C_t$ is the current number of wireless devices 120-122 that are connected using the first type of wireless service (e.g., LTE), but don't meet the threshold requirements to receive the second type of wireless service (e.g., 3G service), and a is a constant between 0 and 1.

If the moving average is greater than a threshold, flow proceeds to box 608. If the moving average is less than the threshold, flow proceeds to box 606 where the process is done (604). If the moving average is greater than a threshold, the threshold(s) for 4G network entry are adjusted (608). For example, access node 110, can determine new values for certain parameters that govern 4G network entry. In an embodiment, access node 110 can calculate a new RSRP threshold for LTE network entry (attach procedure) or LTE network reentry from RRC IDLE state. For example, access node 110 can increase the minimum RSRP threshold for network access by, for example, 5 dB. This adjustment shrinks coverage area 141. Access node 110 may also calculate a new RSRQ threshold for LTE network entry (attach procedure) or LTE network reentry from RRC IDLE state. For example, access node 110 can increase the minimum RSRQ threshold for network access by, for example, 2 dB. This adjustment shrinks coverage area 141.

System information messages are broadcast to adjust threshold(s) used by wireless devices for 4G network entry (610). For example, access node 110 may broadcast the adjusted minimum RSRP and minimum RSRQ thresholds in the LTE specified SIB1 and/or SIB3.

Figure 7:
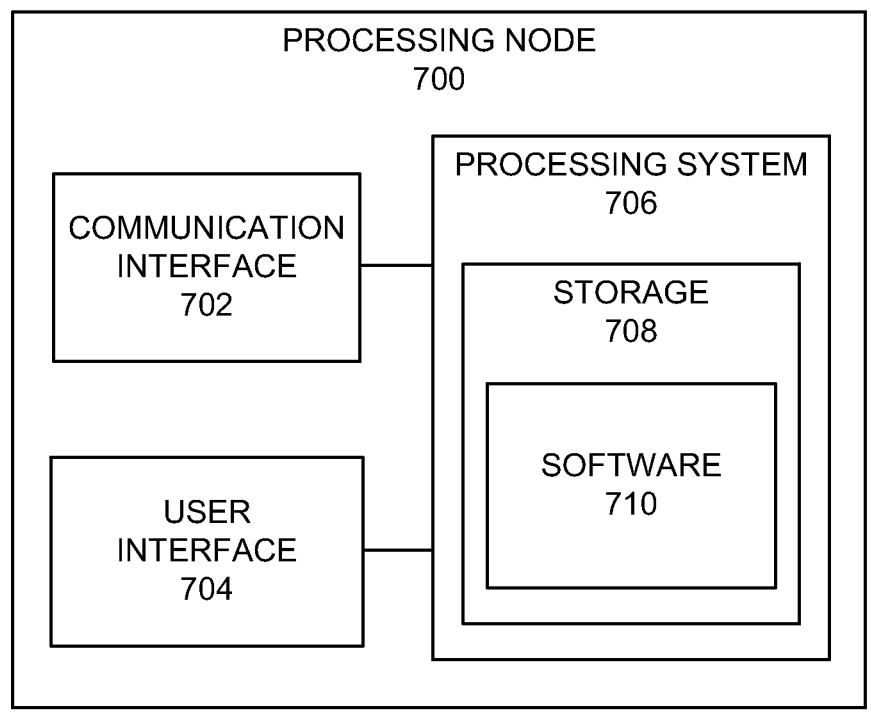
FIG. 7 illustrates a processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node 110. Processing node 700 can also be an adjunct or component of a network element, such as an element of access node 110, 111, and/or 112, an element of wireless device 120-123, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   communicating with a plurality of wireless devices using a first type of wireless service, the plurality of wireless devices including a first wireless device;
   sending a command to the first wireless device that results in the first wireless device scanning for a second type of wireless service;
   receiving an indicator from the first wireless device that a first threshold criteria associated with the first wireless device not being within a coverage area for the second type of wireless service is met; and,
   based on the plurality of wireless devices meeting the first threshold criteria, configuring the first wireless device with a second threshold criteria that reduces a coverage area for the first type of wireless service.

2. The method of claim 1, wherein the configuring the first wireless device comprises broadcasting a configuration message that configures the plurality of wireless devices with the second threshold criteria that reduces the coverage area for the first type of wireless service.

3. The method of claim 1, further comprising:
   determining a time series of a number of the plurality of wireless devices meeting the first threshold criteria.

4. The method of claim 3, further comprising:
   smoothing the time series to determine a moving average of the number of the plurality of wireless devices meeting the first threshold criteria.

5. The method of claim 4, wherein the moving average meeting a third threshold criteria determines whether the configuration message that configures the plurality of wireless devices with the second threshold criteria is to be sent.

6. The method of claim 5, wherein said smoothing is based on an autoregressive model of the number of the plurality of wireless devices meeting the first threshold criteria.

7. The method of claim 5, wherein said smoothing is based on a moving average comprising the calculation:

$$A_t = \alpha C_t + (1-\alpha) A_{t-1}$$

where $A_t$ is the moving average for the current iteration, $A_{t-1}$ is the moving average for the previous iteration $C_t$ is the current number of the plurality of wireless devices meeting the first threshold criteria, and a is a constant.

8. A communication system, comprising:
   a first access node configured to communicate with a plurality of wireless devices using a first type of wireless service, the plurality of wireless devices including a first wireless device; and,
   a second access node configured to communicate with the plurality of wireless devices using a second type of wireless service, the first access node further configured to receive indicators from the plurality of wireless devices whether a first threshold criteria associated with the second access node being able to serve a respective one of the plurality of wireless devices is met and, based on a count of the plurality of wireless devices not having the first threshold criteria met, configuring the plurality of wireless devices with a second threshold criteria that reduces a coverage area where a third threshold criteria associated with the first access node being able to serve the respective ones of the plurality of wireless devices is met.

9. The communication system of claim 8, wherein the first access node broadcasts a configuration message to reduce the coverage area where the third threshold criteria is met.

10. The communication system of claim 8, wherein the first access node is further configured to determine a time series of the count of the plurality of wireless devices not having the first threshold criteria met.

11. The communication system of claim 10, wherein the first access node is further configured to determine a moving average based on a time series of the count of the plurality of wireless devices not having the first threshold criteria met.

12. The communication system of claim 11, wherein the moving average meeting a third threshold criteria determines whether the plurality of wireless devices are configured with the second threshold criteria that reduces the coverage area.

13. The communication system of claim 11, wherein a first frequency band being used by the first access node and a second frequency band being used by the second access node have different over-the-air propagation characteristics.

14. The communication system of claim 10, wherein said first access node and said second access node are co-located.

15. A method of operating a communication system, comprising:
- communicating with a plurality of wireless devices using a first access node co-located with a second access node, the first access node communicating using a first type of wireless service;
- receiving, from each of a first subset of the plurality of wireless devices, a corresponding indicator of a scan result, each scan result indicating whether a respective one of the first subset of the plurality of wireless devices meets a first threshold criteria for being served by the second access node using a second type of wireless service;
- determining a time series of a count of a second subset of the plurality of wireless devices that do not meet the first threshold criteria for being served by the second access node using the second type of wireless service;
- determining, from the time series, an indicator of a moving average of the time series; and,
- based on the moving average, configuring the plurality of wireless devices with an indicator of a second threshold criteria that reduces a coverage area of the first type of wireless service.

16. The method of claim 15, wherein the second threshold criteria is based on signal power.

17. The method of claim 15, wherein the second threshold criteria is based on signal quality.

18. The method of claim 15, wherein if the moving average exceeds a third threshold criteria, the plurality of wireless devices are then configured with the indicator of the second threshold criteria that increases a required signal power for being served by the first access node using the first type of wireless service.

19. The method of claim 15, wherein if the moving average exceeds a third threshold criteria, the plurality of wireless devices are then configured with the indicator of the second threshold criteria that increases a required signal quality for being served by the first access node using the first type of wireless service.

20. The method of claim 15, the indicator of the moving average of the time series is based on an autoregressive model of the count of the second subset of the plurality of wireless devices that do not meet the first threshold criteria for being served by the second access node using a second type of wireless service.

* * * * *